United States Patent [19]

Barber, Jr.

[11] 4,366,807
[45] Jan. 4, 1983

[54] NATURAL CIRCULATION SOLAR HEAT COLLECTION AND STORAGE SYSTEM

[75] Inventor: Everett M. Barber, Jr., Guilford, Conn.

[73] Assignee: Sunworks, Inc., Guilford, Conn.

[21] Appl. No.: 203,400

[22] Filed: Nov. 3, 1980

Related U.S. Application Data

[63] Continuation of Ser. No. 10,040, Feb. 7, 1979, abandoned.

[51] Int. Cl.³ .......................... F24J 3/02; F28D 13/00
[52] U.S. Cl. .................................... 126/434; 126/437; 126/400; 165/104.13
[58] Field of Search ............... 126/421, 420, 900, 437, 126/435, 434; 165/104.13

[56] References Cited

U.S. PATENT DOCUMENTS

| | | | |
|---|---|---|---|
| 3,406,244 | 10/1968 | Okjay | 126/104.13 |
| 3,989,032 | 11/1976 | Harrison | 126/420 |
| 4,262,485 | 4/1981 | Kuroda | 126/104.13 |

FOREIGN PATENT DOCUMENTS 2413255 7/1975 Fed. Rep. of Germany ...... 126/434

*Primary Examiner*—Samuel Scott
*Assistant Examiner*—G. Anderson
*Attorney, Agent, or Firm*—Costas, Montgomery & Dorman

[57] ABSTRACT

A solar heat energy collection system of the natural circulation type where the heat store is located above liquid cooled collectors. The system utilizes at least two liquids, the first is a non-freezing liquid which circulates between a heat store tank and the collectors, the second liquid is less dense than the first and immiscible therewith and acts as a heat store and also to supply the heat load. A third liquid less dense than the second and immiscible therewith may be utilized to supply the heat load. In this latter situation, the second liquid acts only as a heat store.

13 Claims, 4 Drawing Figures

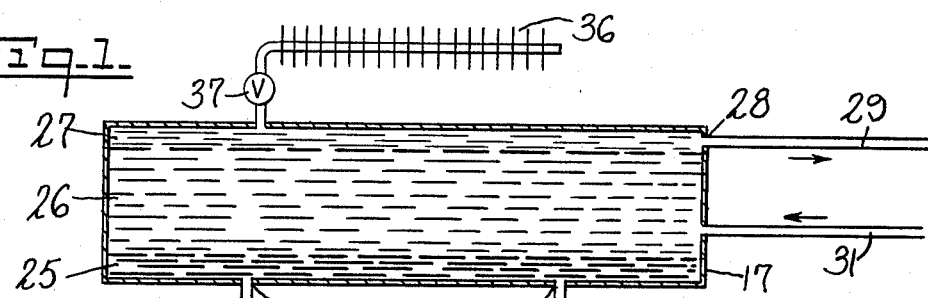
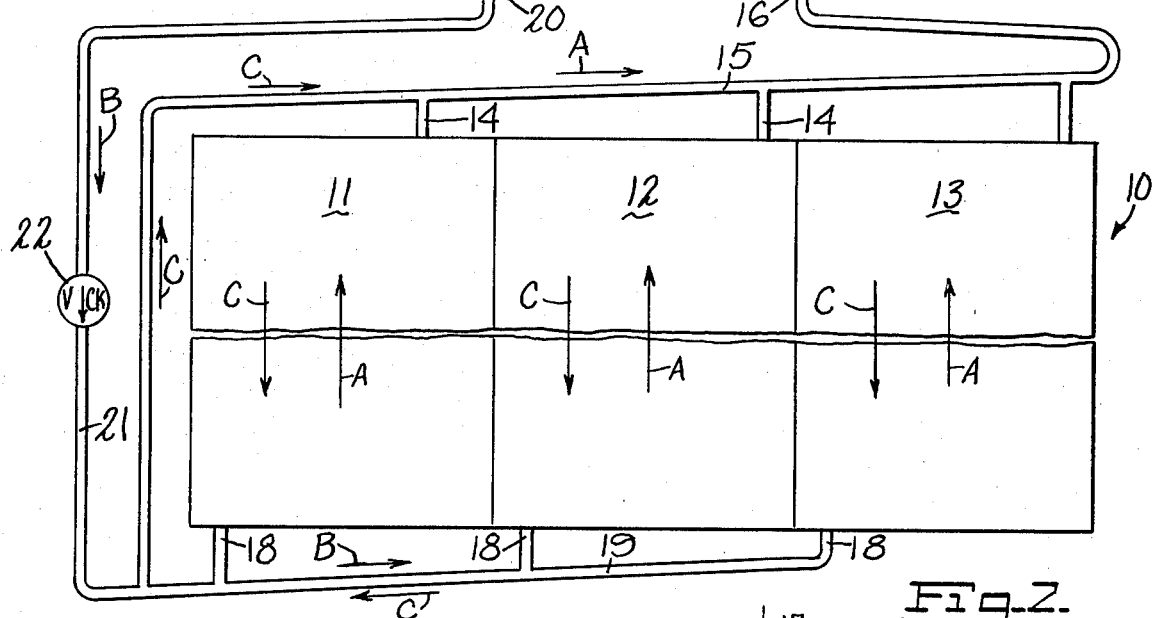
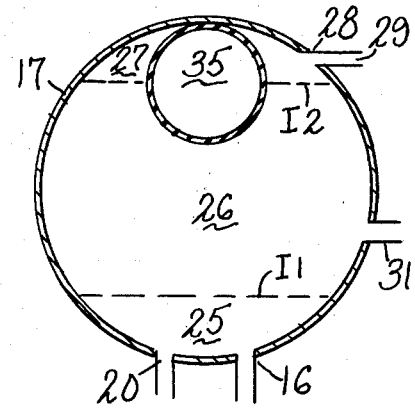
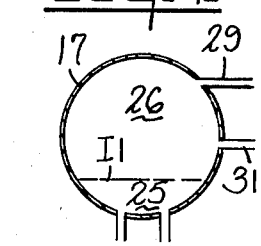
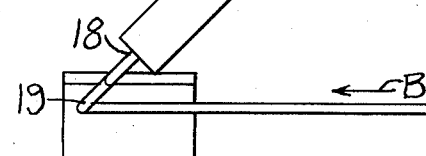

NATURAL CIRCULATION SOLAR HEAT COLLECTION AND STORAGE SYSTEM

This is a continuation application of Ser. No. 10,040 filed Feb. 7, 1979, now abandoned.

This invention relates to solar heat energy collection systems and more particularly relates to such a system of the natural circulation type.

There are two types of flat plate solar heating collectors presently in use, liquid cooled and air cooled. The term "cooled" is used inasmuch as the fluid medium will cool the absorber as it accepts heat therefrom. In general, where a heated liquid is desired, the liquid cooled collector is more practical to use and where heated air is desired, an air cooled collector is generally used. Although a liquid cooled collector can be used to heat air and vice versa, there are certain penalties that must be paid in such conversion. When the liquid cooled collector is used to heat air, a heat exchanger is used to transfer the heat between the two fluids. The heat exchanger adds cost to the system and lessens the thermal efficiency of the system. If an air cooled collector is used to heat water, then a heat exchanger must be used. The heat exchanger is undesirable here for the same reasons that it was undesirable in the liquid cooled collector to a heated air system.

Liquid cooled collectors generally have a higher thermal efficiency than air cooled collectors since the heat transfer coefficients for liquids are better than for air. Water is one of the best coolants for liquid cooled collectors due to its physical properties. However, water has a major drawback in liquid cooled systems that are located in climates where freezing conditions are encountered. Water reaches its maximum density at a temperature of 4° C. As it cools below that temperature, its density decreases. When it freezes, it increases in volume by about nine percent. This expansion will rupture coolant flow passages of a collector, resulting in costly repairs. If water is to be used as the coolant in a collector, then some means is needed to keep the water from freezing during cold weather. Automatic controls, either mechanically or electrically operated, can protect the collector. Freeze protection can occur by circulating warm water through the collector, by draining the water from the collector, or by electrically heating the collector during periods when freeze-up might occur. A major problem with such means of preventing water cooled collectors from freezing has been the rather poor reliability of the control devices, as well as the additional cost of the control devices. Furthermore, these measures detract from overall system efficiency.

In recent years there has been a rapid growth of the solar equipment industry in the United States. Virtually all of the solar heat collection and storage systems installed in recent years have employed a motor-driven fan or pump to produce circulation of a heat transport fluid, such as air or a liquid through the collectors. The solar energy collected on the absorbers of the collectors is transmitted by the transport fluid to some other part of the system, either to a heat storage means or directly to a heating load.

In other countries where solar energy has been used for a number of years, solar heating systems that rely upon natural circulation of the heat transport medium between a collector and the heat store are being used. In such systems the heat store is located above the collectors. Circulation occurs due to a density difference between the fluid in the collector and that in the heat store. When the sun heats the fluid in the collector, that fluid becomes less dense than the surrounding fluid and thus rises. The warm fluid in the collector rises through connecting piping or ducting to the upper part of the heat store. Cooler fluid in the bottom of the heat store replaces the fluid from the collector. This type of system is usually referred to as a natural circulation, thermosyphon, or gravity circulation system.

Such natural circulation systems have not been used recently in the United States, but are used extensively in place of forced circulation systems where the use of solar energy is well established. Typical countries are Japan, Australia and Israel. In the United States between 1910 and 1940 there was considerable use of solar energy for water heating using natural circulation in Southern Florida, Arizona and California.

Accordingly, there are two very significant characteristics of natural circulation systems. They are more thermally efficient than forced circulation systems. In addition, their simplicity adds greatly to the reliability of the system and to the reduced need for maintenance.

The natural circulation systems have been of a single fluid type wherein the fluid circulating through the collectors also moved to the heat store or to the heat load.

The thermal efficiency of the natural circulation systems is probably higher because circulation between collectors and heat storage in a natural circulation system begins at much lower temperature differentials than occurs in forced circulation systems. The controllers for forced circulation systems do not start the circulator until there is between a 15° F. and 20° F. temperature difference between collectors and heat storage. The circulator is shut off when there is a temperature differential between collectors and storage of between 3° F. and 6° F. The controllers can be adjusted with closer differentials, but this is usually not done because of the short cycling of the circulator that occurs on overcast days, which is detrimental to the life of the pump and controller. The elimination of a pump in a natural circulation system also helps the net system efficiency because the energy needed to operate a pump and controller must be subtracted from the total heat energy collected by the system.

Accordingly, this invention provides a new and improved solar heat energy collection and storage system of the liquid cooled collector type utilizing natural convection. The coolant in the collectors is selected to be a liquid which will not freeze at minimum temperatures normally encountered where these installations are made. Such liquid circulates between the collectors and a storage tank. Also contained within the storage tank is a second liquid. The second liquid is not miscible in the first and is less dense than the collector cooling liquid. The second liquid accepts heat from the heated liquid in the collectors and may be circulated to the load. A third liquid less dense than the second liquid and immiscible with respect to the second liquid may also be contained in the storage tank. In this case the second liquid acts as the heat store and the third liquid supplies the heat to the load. The second liquid will generally be water, and, if necessary, freeze protection techniques may be incorporated in the storage tank.

If the heat load can be located above the storage tank, then there is no necessity for forced circulation between the storage tank and the heat load. Circulation will occur between the heat storage tank and the load by natural circulation. In cases where the storage tank is located above the heat load, a device must usually be provided to force circulation of the heating fluid between the storage tank and the load.

An object of this invention is to provide a new and improved solar heat energy collection and storage system of the natural circulation type.

A further object of this invention is to provide a new and improved solar heat energy collection and storage system of the natural circulation type using liquid cooled collectors in which two or more liquids are provided for heat collection, heat storage, and supply to a heating load.

Another object of this invention is to provide a system of the type described which is protected against freezing.

The features of the invention which are believed to be novel are particularly pointed out and distinctly claimed in the concluding portion of this specification. However, the invention both as to its organization and operation together with further objects and advantages thereof may best be appreciated by reference to the following detailed description taken in conjunction with the drawings, in which:

FIG. 1 is a front elevation of a system embodying the invention;

FIG. 2 is a side view of the system of FIG. 1 with the storage tank in section;

FIG. 3 is a view of the storage tank similar to FIG. 2 further including a freeze cushioning bladder; and FIG. 4 is a sectional view through another storage tank which may be used in the invention.

A system embodying the invention as illustrated in FIG. 1 comprises at least one but preferably a series 10 of solar energy collectors of the liquid heat-exchange type including collectors 11, 12 and 13. The collectors may be of the type shown in U.S. Pat. No. 3,980,071 wherein a plurality of conduits connected by upper and lower headers are in intimate heat exchange relation with an absorber. Alternatively, the collectors may be of the direct header connection type as disclosed in application Ser. No. 883,393, filed Mar. 6, 1978. The upper headers have connections 14 to an upper manifold 15 which leads to a lower connection 16 of a liquid storage tank 17. The lower headers have connections 18 to a lower manifold 19 which is also connected at a lower portion 20 of tank 17.

The collectors, as exemplified in FIG. 2, are inclined at an angle to the vertical, depending upon the latitude of installation, to receive incident solar energy. Tank 17 contains three liquids 25, 26 and 27. These liquids have different densities and the adjacent liquids are immiscible in each other and therefore form layers within tank 17. The most dense liquid 25 is preferably a fluorinated hydrocarbon. A suitable fluorinated hydrocarbon is one known as Fluorinert, marketed by the 3M Company. A necessary characteristic of the most dense liquid is that it should have a low freezing point, preferably below the minimum temperatures encountered at the place of installation. If it does freeze, it should reduce in volume as the temperature drops below the freezing point so it will not damage the collectors. It must not be miscible in the liquid immediately above it in the storage tank. Additionally, it should have a high boiling point so that it does not build up pressure in the storage tank on a hot day. It should also have good heat transport characteristics and must not be corrosive to the materials used in the system. It should have a high coefficient of thermal expansion so it will function well in a natural circulation system. If only two liquids are to be used in the system and the second liquid is to be in contact with potable water, then the most dense liquid should also be non-toxic.

The next most dense liquid 26 which forms an interface I1 with liquid 25 should have a high specific heat because it is used primarily to store the heat collected from the collectors and it shall not be miscible with the liquid above it or below it. It should have a high boiling point, at least as high as that of water, preferably higher, and a low freezing point, preferably lower than that of water. It should have a viscosity at least equal to water, but the lower the viscosity the better convection will occur within the liquid. It must not react chemically with the liquid above or below. It also is preferably non-toxic, non-flammable, and non-corrosive to the components of the system. The liquid 26 may be water or water with a salt added to increase its specific heat.

The least dense liquid 27, when used, will sit atop the liquid 26 and define interface I2 therewith. The liquid 27 must have a low freezing point, preferably below the minimum temperatures encountered at the site of installation. It should have a high boiling point, preferably above that of water. It should have sufficiently low viscosity that it can be pumped when it is at very low temperatures which may be as low as $-50°$ F. It must not be miscible with the liquid 26 nor should it react with it chemically and it should be non-corrosive to the components of the system. A liquid which will satisfy these characteristics is silicone oil. Connected to the tank at 28 is an output conduit 29 adapted to conduct the heat liquid 27 to a heat load designated by the reference numeral 30. The heat load 30 may be the space heating apparatus of a dwelling or other structure. The liquid 27 is returned from the heat load to tank 17 through a conduit 31. The conduit 29 will require a pump 32, when the heat load is below the top of the heat storage tank. As exemplified in FIG. 2, the storage tank 17 is inside of a structure S, but this may not always be the case, as hereinafter discussed. Tank 17 is mounted on a support shown by reference numeral 17a.

In operation, the system of FIGS. 1 and 2 functions as follows. When the solar energy is incident upon the absorbers of the collector system, filled with the most dense liquid 25, the increase in the temperature of the liquid 25 will cause it to decrease in density and therefore rise and move through manifold 15 to the bottom of the storage tank 17, as shown by arrows A. Inside the tank 17, heat from liquid 25 is transferred to the liquid 26 across the interface I1. The intermediate liquid then stores the collected heat and the cooled liquid 25 becomes more dense and moves through conduit 21 to manifold 19 and back to the collectors as shown by arrows B.

Liquid 26 heats the least dense liquid 27 across interface I2. The liquid 27 is moved by pump 32 to the load 30.

The return line 30 of the liquid 27 to tank 17 may be intermediate interfaces I1 and I2. The returning liquid 27, being less dense than the liquid 26, will move upwardly past interface I2 and will receive some heat from liquid 26 during such movement.

In practice, all conduits and tank 17 if outside the structure will be insulated to guard against heat loss and also freezing. Tank 17 may also be insulated if within a structure to enhance system efficiency.

Within tank 17, liquid 25 acts as a heat source, liquid 26 is the heat store, and liquid 27 is the heat supply to the load 30.

A previous problem with natural circulation systems is reverse circulation that occurs at night when the collectors are colder than the liquid in the storage tank. One way to minimize this problem is to place the storage tank several feet above the upper manifold 15. This creates sufficient heat to reduce the reverse circulation. Another technique is to install a by-pass line 34 between manifolds 15 and 19. This allows circulation through the collectors to bypass the heat storage tank when the liquid in the collectors is colder than that in the storage tank, as shown by the arrows C.

A structure for protecting against damage to tank 17, should freezing occur, is shown in FIG. 3. A sealed bladder or air cushion 35 is located in tank 17. Should the heat storage liquid freeze and expand, such expansion will be taken up by compression of the air in bladder 35.

FIG. 4 exemplifies another embodiment of the invention where only the liquids 25 and 26 are utilized. Liquid 26 is utilized to supply the heat load 30 as well as be the heat store. The bladder 35 may be incorporated in the tank of FIG. 4.

In some locations, where there may be concern of the build-up of excess heat, a heat rejector or heat wasting device 36 may be connected to the upper portion of tank 17 through a valve 37 to waste the excess heat. The valve 37 may be in the form of a thermostat to allow the upper liquid in tank 17 to circulate through the heat waster 36 and back to the tank.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What is claimed is:

1. A solar heating system comprising at least one collector of the liquid heat-exchange type, said collector disposed at an angle to the horizontal to accept solar radiation and such that fluid flow passages of the collector have upper and lower ends, a liquid storage tank mounted above said collector, first conduit means connecting the lower end of said collectors to said tank, second conduit means connecting the upper end of said collector to said tank, said tank containing at least two immiscible liquids of different densities defining a heat-exchange interface, the first, higher density liquid passing through said collector and said first and second conduit means, whereby as the first liquid in said collectors is heated and becomes less dense it moves through said second conduit means to said tank and as it gives up heat to the second liquid at the interface it becomes more dense and flows back to said collectors through said first conduit means, and third and fourth conduit means connecting said tank to a heating load.

2. The system of claim 1 further including a by-pass conduit connected between said first and second conduit means.

3. The system of claim 1 further including a third liquid in said tank of lesser density than said second liquid and immiscible in said second liquid, said third and fourth conduit means connected to said tank to circulate said third liquid to the heating load.

4. The system of claim 1 further including an air bladder in said tank adopted to be compressed to accept expansion upon freezing of a liquid in said tank.

5. The system of claim 3 further including an air bladder in said tank adopted to be compressed to accept expansion upon freezing of a liquid in said tank.

6. The system of claim 1 further including liquid circulating means in one of said third and fourth conduit means.

7. The system of claim 3 further including liquid circulating means in one of said third and fourth conduit means.

8. The system of claim 1 further including means external to said tank for dissipating heat stored therein.

9. The system of claim 3 further including means external to said tank for dissipating heat stored therein.

10. A solar heating system comprising at least one collector of the liquid heat-exchange type, said collector disposed at an angle to the horizontal such that the fluid flow passages of the collector have upper and lower ends, a liquid storage tank mounted above said collector, first conduit means connecting the lower end of said collectors to said tank, second conduit means connecting the upper end of said collector to said tank, said tank containing at least three liquids of different densities, the first, higher density liquid passing through said collector and said first and second conduit means, whereby as the first liquid in said collectors is heated and becomes less dense it moves through said second conduit means to said tank and as it gives up heat to the second liquid at the interface it becomes more dense and flows back to said collectors through said first conduit means, the second middle density liquid being immiscible in said first liquid, the third lower density liquid being immiscible in the second liquid, and third and fourth conduit means connecting said tank to a heating load.

11. The system of claim 10 further including a by-pass conduit connected between said first and second conduit means.

12. The system of claim 10 further including an air bladder in said tank adopted to be compressed to accept expansion upon freezing of a liquid in said tank.

13. The system of claim 10 further including means external of said tank for dissipating heat stored therein.

* * * * *